APPARATUS FOR GAGING COMPONENTS

Filed June 26, 1961 3 Sheets-Sheet 1

INVENTOR
Henry D. Mitchell, Jr.,
BY R. P. Miller
ATTORNEY

Sept. 29, 1964 H. D. MITCHELL, JR 3,150,774

APPARATUS FOR GAGING COMPONENTS

Filed June 26, 1961 3 Sheets-Sheet 2

INVENTOR

Henry D. Mitchell, Jr.

BY R. P. Miller

ATTORNEY

APPARATUS FOR GAGING COMPONENTS

Filed June 26, 1961 3 Sheets-Sheet 3

INVENTOR

Henry D. Mitchell, Jr.,

BY R. P. Miller

ATTORNEY

United States Patent Office 3,150,774
Patented Sept. 29, 1964

3,150,774

APPARATUS FOR GAGING COMPONENTS

Henry D. Mitchell, Jr., Winston-Salem, N.C., assignor to Western Electric Company, Incorporated, New York, N.Y., a corporation of New York
Filed June 26, 1961, Ser. No. 119,648
7 Claims. (Cl. 209—85)

This invention relates to apparatus for gaging components and more particularly to an apparatus for propelling a component toward a gaging device whereafter the components are automatically sorted in accordance with a physical dimension.

In the manufacture of components, it is often necessary to determine if a physical dimension of the component is within predetermined limits. More particularly, in the manufacture of cylindrical components such as deposited carbon resistors wherein a resistor core is advanced through facilities for encapsulating the core in plastic, it is necessary to gage each encapsulated resistor to determine whether or not a certain dimension thereof exceeds a predetermined value. During the encapsulation of the resistor, the encapsulating cover may rupture or become distorted or bulged, resulting in a product that has physical dimensions beyond prescribed limitations.

An object of this invention is to provide a new and improved apparatus for gaging components.

Another object of this invention is to provide a pneumatic propulsion device in conjunction with a gage for sorting components having a certain dimension from a supply of randomly dimensioned components.

Still another object of this invention resides in the provision of a device for propelling components from a component supplier into a test device wherein an acceptable component passes through the test device and is returned to the component supplier.

A further object of this invention is to provide separable facilities having a bore therethrough for testing components and a device for advancing components into the bore wherein instrumentalities are provided for separating the facilities to release a component that becomes lodged in the bore.

A still further object of this invention resides in the provision of a looped facility for receiving an acceptable component from a test fixture and returning the component to an article conveyor.

With these and other objects in view, the present invention contemplates a split test fixture provided with a bore of a predetermined cross-sectional configuration. The bore is centered on the split for gaging a component having a cross-sectional configuration identical to that of the bore. Facilities are provided for propelling the component from a conveyor into the bore so that if a dimension of the cross-sectional configuration of the component does not exceed the corresponding dimension of the bore, the component will pass through the bore. A pneumatic conveying device is then actuated to return the component to the conveyor. If the value of the dimension exceeds that of the bore, the component will become lodged in the bore whereafter facilities are actuated for separating the portions of the split test fixture to release the lodged component.

Other objects and advantages of the present invention will be apparent from the following detailed description when considered in conjunction with the accompanying drawings wherein.

Figures 1, 2:
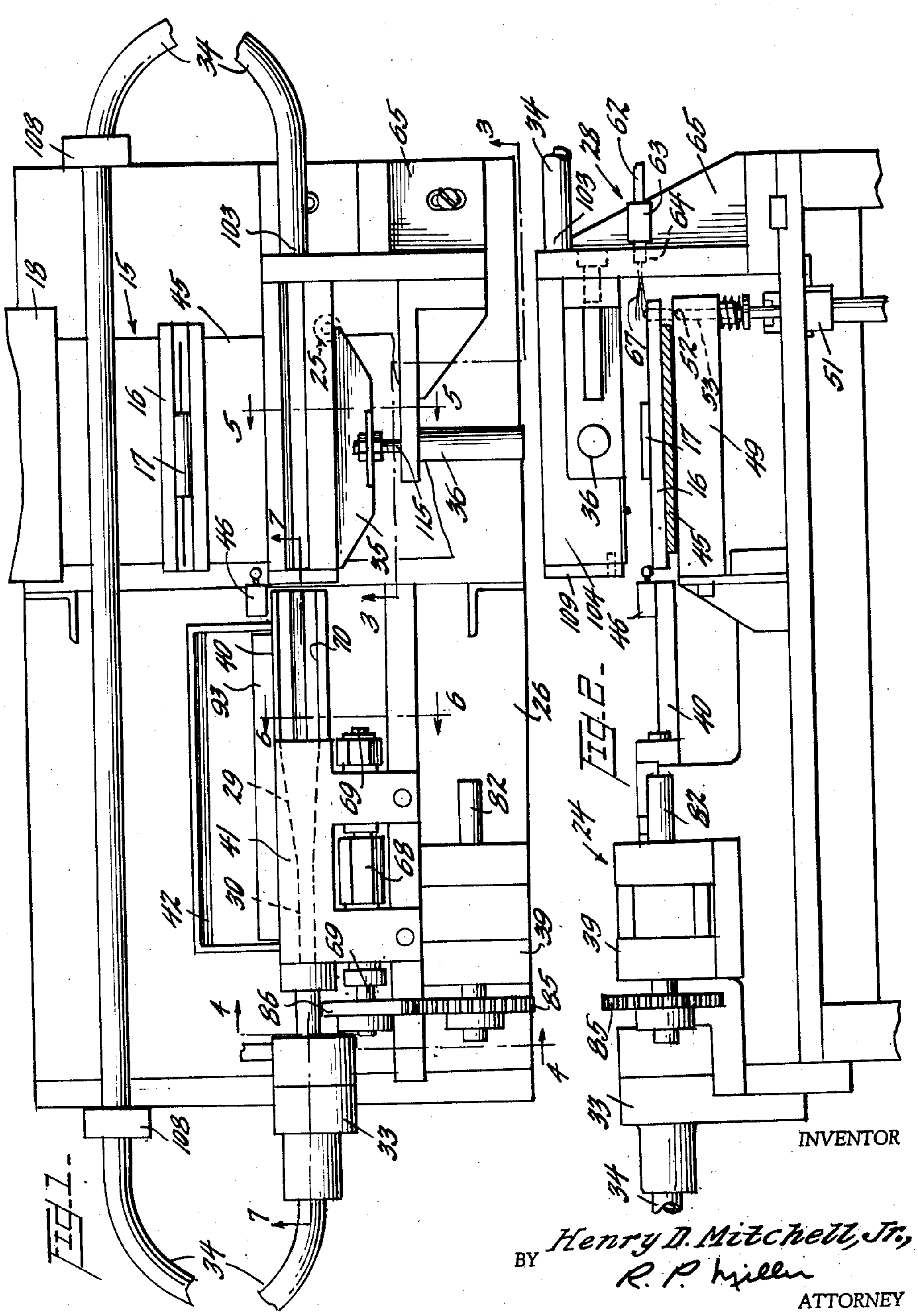
FIG. 1 is a plan view of a conveyor for advancing components into alignment with a bore provided in a device for gaging components according to the invention.
FIG. 2 is a side elevational view of FIG. 1 showing an air jet device for propelling a component off the conveyor into the bore of the gaging device wherein defective components are retained in the bore and acceptable components are returned to the conveyor.
Figure 8B:
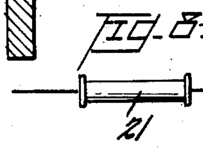
FIGS. 8A and 8B are elevational views of defective components which the test device sorts from acceptable components.
Figure 8A:
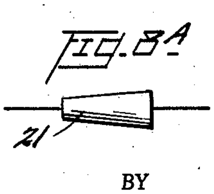

Referring in general to FIG. 1, a conveyor 15 is shown advancing pallets 16 which carry and advance a component such as a deposited carbon resistor 17 through an encapsulating machine 18 which fully encapsulates the resistors in plastic. An encapsulating machine of this type is disclosed in application Serial No. 797,913 filed in the name of J. D. Lewis, on March 9, 1959, now Patent Number 3,012,273. The encapsulating machine 18 may at certain times during its operation produce a defective resistor 21 having configurations such as the bulged or tapered peripheral surface shown in FIG. 8A or the flanged end cart wheel structure shown in FIG. 8B. The pallets 16 may thus exit from the encapsulating machine 18 supporting both encapsulated resistors having a cylindrical or acceptable configuration 23 and defective components as above-described. The conveyor 15 advances the pallets 16 into alignment with a gaging fixture or test device 24 mounted on a frame 26 whereupon a pin stop device 25 is actuated for holding the pallet 16 and therefore the resistor 17 in alignment with the gaging device 24.

An electrical timer 27 (FIG. 9) is also energized upon alignment of the pallet 16 for operating an air jet device 28 (see also FIG. 3) that is aligned with the gage device 24 and the pallet. Actuation of the air jet device 28 propels the resistor 17 to the left (as shown in FIG. 1) into a tapered bore 29 that is formed in the gaging device. The cylindrical or acceptable resistors 23 having a predetermined diameter will advance through the tapered bore 29 and pass into a cylindrical gaging bore 30 which has a diameter equal to the predetermined diameter. At this time a pneumatic pusher or Venturi 33 further advances the resistor 23 through the test device 24 and into a tubular loop 34 which guides the thus accepted resistor 23 over the conveyor 15 and onto a slide or plate 35. An air cylinder 36 (FIG. 6) is then actuated for retracting the slide 35 whereupon the accepted resistor 23 drops onto and is thus returned to the aligned pallet 16 for subsequent advancement to another fabricating machine (not shown).

If the air jet device 28 propels a defective resistor 21 into the tapered bore 29, the resistor will become lodged and thus retained in the tapered bore. The timer 27, after a delay sufficient to permit an acceptable resistor 23 to pass completely through the test device 24, actuates a pneumatic rotary motor 39 for moving a lower portion 40 (FIGS. 4 and 7) of the gaging device away from an upper portion 41 (FIGS. 4 and 7) thereof to release the resistor 21 which then drops into a receptacle 42.

Referring in detail to FIG. 1, the conveyor 15 is shown advancing the spaced pallets 16 from the encapsulating machine 18. The conveyor includes a belt 45 that is supported between pulleys (not shown) and slides on a bed 49 (FIG. 2) for continuously advancing the pallets from the encapsulating machine and into alignment with the gaging fixture 24. As each pallet is advanced by the conveyor, a microswitch 46 is actuated for energizing an "up" coil 47 of a solenoid valve 48. Energization of the coil 47 positions a valve which supplies air pressure from a reservoir 59 to a pneumatic cylinder 51 of the pin stop device 25. Actuation of the pneumatic cylinder 51 advances a piston (not shown) which drives a shot pin 52 through the aperture 53 formed in the conveyor bed 49. The shot pin 52 is thus projected upwardly into the path of the right end of the pallet 16 as viewed in FIG. 2. Inasmuch as the pallet 16 is only frictionally supported on the conveyor belt 45, the shot pin 52 maintains the pallet in alignment with the test fixture 24.

Figure 3:
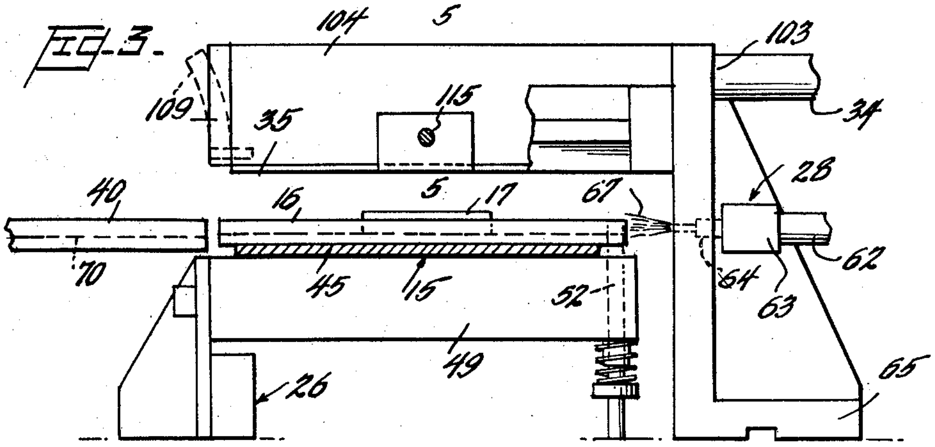
FIG. 3 is a partial cross-sectional view taken on line 3—3 of FIG. 1 showing a conduit for supplying air to a nozzle provided in the air jet device.

The pin stop microswitch 46 also energizes the timer 27 (shown in FIG. 9) which rotates a cam shaft 54 through a timed predetermined cycle of rotation. When the pin stop 25 has been actuated to stop the pallet 16 in alignment with the gaging device 24, the timer 27 rotates the cam shaft 54 to position cam 56 for actuating a microswitch 57 which initiates operation of the air jet device 28 (FIGS. 2 and 3). The air jet device 28 includes a solenoid valve 58 that is energized upon actuation of the air jet microswitch 57 to connect a pneumatic reservoir 59 to a pneumatic conduit 62. The conduit 62 supplies air pressure to a needle valve 63 which may be adjusted to regulate the flow of air to an aperture or nozzle 64 that is mounted in a bracket 65. The bracket 65 is positioned adjacent the conveyor 15 so that the nozzle 64 is aligned with the gaging device bores 29 and 30 and the aligned pallet 16. Upon energization of the solenoid valve 58 and consequent supplying of air pressure to the conduit 62, a jet 67 of compressed air is directed from the nozzle 64 toward the resistor 17 for propelling the resistor along the pallet 16 and into the tapered bore 29 of the gaging device 24.

Figures 4, 5, 6, 7:
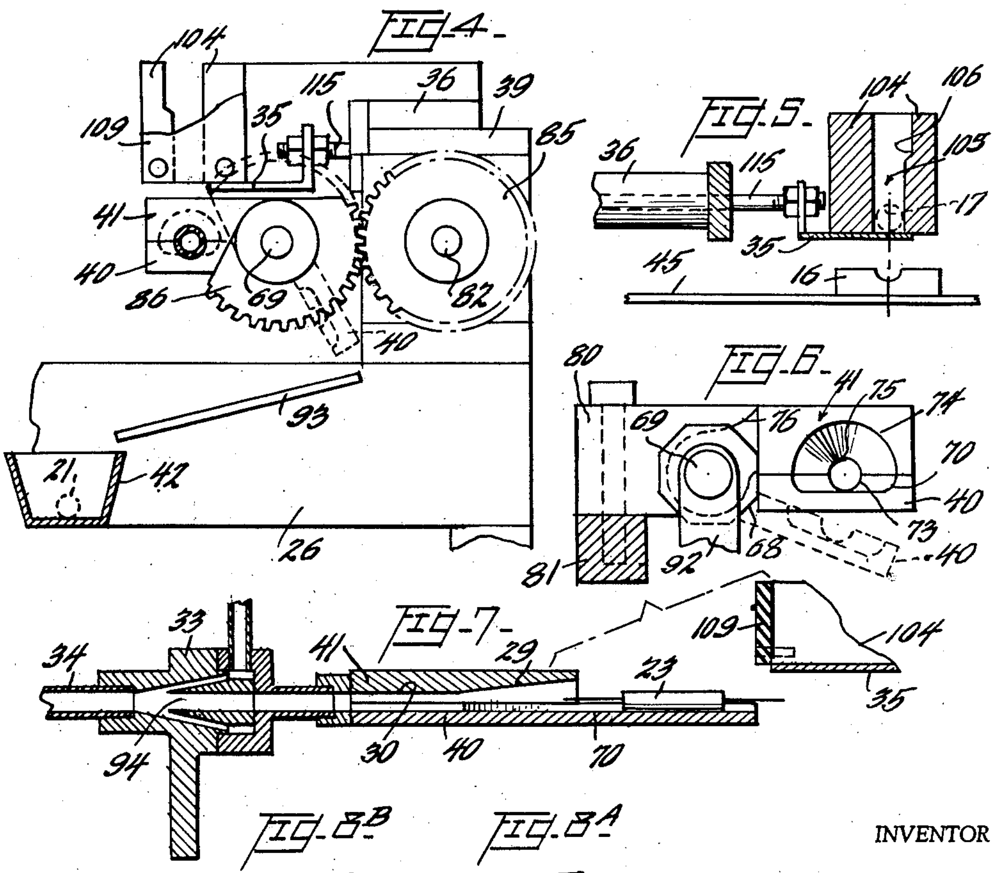
FIG. 4 is a partial cross-sectional view taken on line 4—4 of FIG. 1 showing gears driven by the rotary motor for actuating the test device to release a defective component that is retained in the bore.
FIG. 5 is a cross-sectional view taken on line 5—5 of FIG. 1 showing tapered and cylindrical portions of the bore formed in the gaging device connected to a venturi tube for advancing acceptable components through the device and into a guideway.
FIG. 6 is a cross-sectional view taken on line 6—6 of FIG. 3 showing an acceptable component that has been discharged from the guideway onto a slide plate wherein an air cylinder is actuated to retract the slide plate and drop the component onto the conveyor.
FIG. 7 is a cross-sectional view taken on line 7—7 of FIG. 1 showing engaged upper and lower portions of the test device which are provided with recesses for forming the portions of the bore of the test device.

Referring to FIGS. 6 and 7, the bottom portion or bottom gage block 40 of the gaging device 24 extends to the left from an aligned pallet and is shown having extensions 68 that surround and are fixed to a support shaft 69 for movement therewith. The bottom block is normally horizontally positioned and is provided with a trough-like recess 70 that converges to form a semi-cylindrical recess 73 having the exact radius of an acceptable resistor 23.

The top portion or top gage block 41 overlies the recessed portions of the bottom gage block 40 and is provided with a semi-conical recess 74 that converges to form a semi-cylindrical recess 75 corresponding in radius to the recess 73. Arms 76 extend to the left from the top block 41 and are provided with bearing portions 79 which rotatably receive the support shaft 69. The left extremities 80 of the arms 76 are fastened to an upright support 81 that is mounted to the frame 26 so that the top gage block 41 is maintained in a fixed horizontal position overlying the normally horizontal bottom gage block 40 whereby the recesses formed in the blocks cooperate to form the tapered gage bore 29 that converges into the cylindrical gage bore 30 which has the exact diameter of an acceptable resistor 23.

Referring to FIG. 4, the rotary pneumatic motor 39 is shown connected to a shaft 82 which supports a driver gear 85. The driver gear 85 meshes with and rotates a driven gear 86 that is keyed to the support shaft 69. When the air jet device 28 propels a defective resistor 21 from the pallet 16, the defective resistor slides along the trough-like recess 70 of the bottom gage block 40 and enters the tapered gage bore 29. Depending upon the particular defect of the resistor, the resistor will become lodged at some point in the tapered gage bore 29 and will therefore not enter the cylindrical test bore 30. After a time interval sufficient to permit an acceptable resistor 23 to pass through the cylindrical test bore 30, the timer 27 positions a second cam 87 for actuating a microswitch 88. The microswitch 88 energizes a solenoid valve 91 which connects the pneumatic reservoir 59 to operate the rotary pneumatic motor 39. Operation of the rotary pneumatic motor 39 rotates the driver gear 85 clockwise for rotating the driven gear 86 in the opposite direction to rotate the supporting shaft 69 in journals 92. Inasmuch as the bottom gage block 40 is fixed to the supporting shaft 69, the bottom gage block is rotated counterclockwise into the open position shown in FIG. 4. The defective resistor 21 lodged in the tapered portion 29 of the gage device 24, is thereby released and drops onto a guide plate 93 and then into the receptacle 42. The cam 87 then opens the switch 85 for deenergizing the solenoid valve 91. De-energization of the solenoid valve reverses the rotary motor 39 which rotates the driven gear 86 and thus the supporting shaft 69 in the opposite direction. The bottom gage block 40 is thereby rotated clockwise into its normal horizontal position in engagement with the top gage block 41 to again form the test bores 29 and 30.

It may be appreciated that because the recess 74 formed in the top test block is semi-conical in configuration while the recess 70 in the bottom gage block is trough-like and therefore does not conform to the circular cross section of a cylindrical resistor 23, it is not possible for the resistor to be retained in the trough-like recess. Rather, the resistor 23 tends to roll out of the trough-like recess 70 and onto the guide plate 93 after the bottom test block 40 has been rotated only half-way into its open position.

It is to be understood that the above-described cooperation between the top and bottom test blocks 40 and 41 merely illustrates one possible arrangement of the test device. Thus the provision of facilities for holding the bottom block stationary while moving the gage block out of engagement therewith to release the lodged component is also contemplated.

It is also to be understood that the semiconical tapered test bore 29 is particularly adapted to test tapered and cylindrical components. If it is desired to test components having other cross sectional configurations, the cross section of the recesses that form the gage bores may be machined to correspond to the particular configuration of the component.

Referring to FIG. 5 there is shown an acceptable resistor 23 advancing in the trough-like recess 70 from an aligned pallet 16 into the tapered bore 29. The resistor 23 is advanced by the air jet 67 completely through the gaging bores of the gaging device 24 and into a bore 94 of the Venturi device 33. The timer 27 is effective to position a third cam 97 to actuate a switch 98 at the same time that the cam 56 actuated the switch 57 for supplying air to the air jet device 28. The switch 98 energizes a solenoid valve 99 for supplying air pressure to the Venturi device 33 at the same time that an air jet 67 is emitted from the nozzle 64. The acceptable resistor 23 is thereby simultaneously propelled into one end and pulled out of the other end of the gaging device 24 to advance the resistor 23 through the gaging bores 29 and 30. The passage of air through the Venturi device 33 is effective to pull the resistor core 23 through the gaging bores and through the Venturi bore 94 into the looped tube or guideway 34. The Venturi device 33 is then effective to pneumatically push the accepted resistor 23 through the tube 34.

The looped guideway 34 is supported on brackets 108 in a slightly inclined position so that the terminal end 103 thereof is positioned above the level of the conveyor 15 as shown in FIG. 2. The accepted resistor 23 is discharged from the terminal end 103 of the guideway 34 and advances between a pair of guides or guide blocks 104 that extend to the left over the conveyor 15. The guides 104 are mounted to the bracket 65 in alignment with and positioned above the aligned pallet 16 (FIG. 3). The guides 104 are mounted to the bracket 65 so that a space 105 (FIG. 6) between the guides is aligned with the stopped pallet 16. When the accepted resistor is discharged from the tube 34, it advances downwardly and to the left (as viewed in FIG. 3) in the space 105 between the guides 104. A recess 106 machined in one of the guides 104 further directs the resistor into the space as it drops downwardly on to the slide 35 as shown in FIG. 6.

A resistor 22 discharged from the tube at a relatively high velocity, engages a resilient stop 109 mounted on the end of the guides. The stop 109 is flexed upon engagement with the resistor 23 and stops the leftward movement of the resistor so that the resistor drops into the space 105 between the guides 104 onto the slide 35.

The timer 27 then positions a cam 110 for actuating a microswitch 111 which in turn energizes a solenoid valve 112 for supplying air pressure from the pneumatic reservoir 59 to the air cylinder 36. The air cylinder 36 is mounted to the bracket 65 and drives a piston rod 115 which is attached to the slide 35. Actuation of the air cylinder 36 retracts the slide 35 whereupon the resistor 23 drops downwardly onto the aligned pallet. The timer 27 then positions the cam 110 which operates switch 111 to deenergize the solenoid valve 112 whereupon the slide is restored to the initial position.

Figure 9:
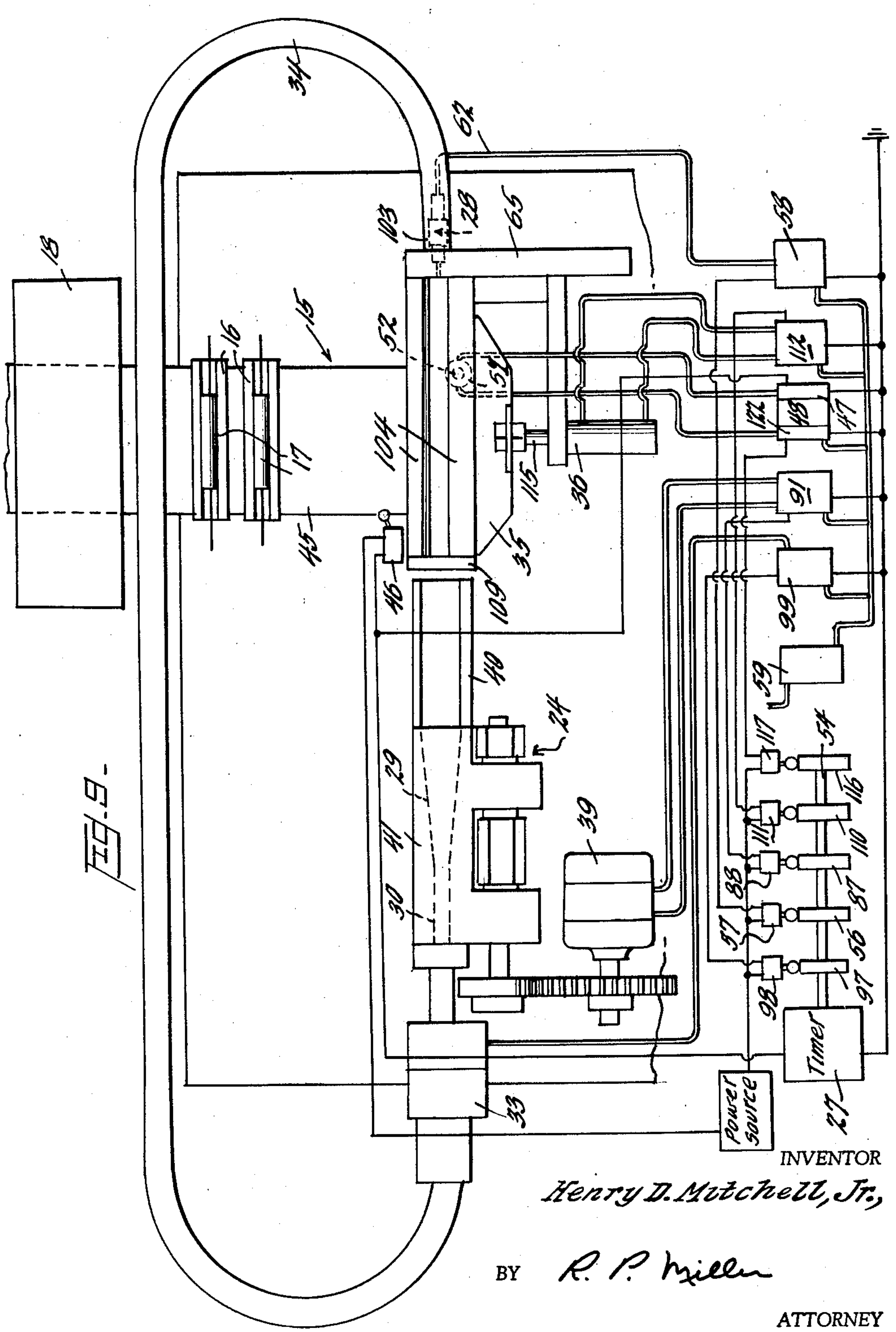
FIG. 9 is a plan view of the test device together with an electro-pneumatic system for controlling the operational cycle of the device.

Referring to FIG. 9, the operation of the gaging device is as follows. The conveyor belt 45 advances a resistor 17 supported on a pallet 16 from the encapsulating machine 18 toward the gaging fixture 24. The left end of the pallet actuates the pin stop microswitch 46 which energizes the solenoid valve 48 for supplying air pressure to the pin stop air cylinder 51. The pin stop air cylinder 51 advances the shot pin 52 into the path of the pallet 16 whereupon the pallet is stopped in alignment with the gaging device 24. Actuation of the pin stop microswitch 46 also energizes the timer 27 for rotating the cam shaft 54. The timer cam shaft 54 positions the cam 56 for actuating the microswitch 57 which energizes the solenoid valve 58 for supplying pneumatic pressure to the air jet device 28. The air jet 67 thus blows or propels the resistor 17 to the left across the pallet 16 and onto the lower gage block for subsequent advancement into tapered gaging bore 29. At the same time as the air jet device 28 is actuated, the cam shaft 54 positions the Venturi cam 97 for actuating the microswitch 98 which is effective to control the supply of pressurized air to the Venturi 33. The Venturi 33 is at this time effective to create a low pressure in the gage bores 29 and 30 so that an acceptable resistor 23 propelled by the air jet 67 is advanced through the cylindrical gaging bore 30 and pushed through the guideway 34 for subsequent discharge onto the slide 35.

A defective resistor 21, however, becomes lodged in the tapered bore 29 and thus does not enter the cylindrical gaging bore 30. The air jet cam 56 at this time opens the microswitch 57 to deenergize the solenoid valve whereupon the air jet 67 is turned off. After a time interval, the Venturi cam 97 opens the switch for deenergizing the solenoid valve 99 whereupon the air supply to the Venturi 33 is turned off.

After the air supply is disconnected from the air jet device 28 and the Venturi device 33, the rotary motor cam 87 closes the microswitch 88 to energize the solenoid valve 91 to supply air pressure to the rotary pneumatic motor 39. Actuation of the rotary motor 39 separates the top gage block 41 from the bottom gage block 40 by advancing the bottom gage block downwardly to the position shown in dashed lines in FIG. 4. The defective resistor 21 which was lodged in the tapered bore 29 is thus released and drops downwardly into the receptacle. The timer shaft 54 then positions the cam 87 for opening the switch 88 to deenergize the solenoid valve 91 whereupon the rotary pneumatic motor 39 is reversed to return the bottom gage block 40 into engagement with the top gage block 41 to once again form the gage bores 29 and 30.

The cam 110 is then rotated by the timer cam shaft 54 to actuate the microswitch 111 which energizes the solenoid valve 112 for supplying pressurized air to the air cylinder 36. Actuation of the air cylinder 36 retracts the slide 35 whereupon the accepted resistor 23 drops onto the pallet 16. A slide cam 116 then closes a microswitch 117 to engage a down coil 122 of the solenoid valve 48.

Energization of the down coil 122 reverses the air pressure supplied to the pin stop air cylinder 51 whereupon the shot pin 52 is retracted. The pallet 16 is thereby no longer barred from advancing with the conveyor belt 45 and thus moves out from under the slide 35 toward the next subsequent fabricating machine. The timer 27 is restored to the initial condition in anticipation of another cycle of operation.

The next subsequent pallet 16 advances from the encapsulating machine 18 and thereafter actuates the pinstop microswitch 46 to commence the next subsequent cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for gaging acceptable and defective articles positioned on an article supplier, a split fixture having a bore formed therethrough on the line of the split, said bore being effective to block a defective article and to pass an acceptable article, an article guideway connected to the terminal end of the bore for guiding acceptable articles passed by the bore, a timer actuated by the article supplier, means actuated by the timer for propelling acceptable and defective articles off the supplier into the fixture so that the acceptable articles pass through the bore and the defective articles are blocked by the bore, and means actuated by the timer at a predetermined interval after operation of the propelling means for separating the elements of the split fixture to release a defective article that is blocked by the bore.

2. In a device for sorting articles advanced on a conveyor, a test fixture having a test bore for passing acceptable articles having a predetermined dimension, air jet means for propelling an acceptable article off the conveyor and through the test bore, a tubular guideway means extending in a looped path from the terminal end of the test bore to the conveyor for guiding an acceptable article from the test fixture back to the conveyor, and means rendered effective upon passage of the acceptable article through the test bore for pushing the acceptable article through the tubular guideway means to the conveyor.

3. In a device for testing the diameter of an article supported on a conveyor, a slide mounted above the path of the conveyor, means for stopping the conveyor in alignment with the slide, a looped tube for guiding an article onto the slide, an air jet device for blowing an article off the stopped conveyor and through the looped tube, hollow test means interposed between the air jet device and the looped tube for precluding articles of greater than a predetermined diameter from entering the tube, and means actuated by the conveyor for retracting the slide to permit the article passed through the loop to drop onto the stopped conveyor.

4. In a mechanism for gaging a cylindrical article carried by a conveyor, means having a test bore formed therethrough for passing acceptable articles having a given diameter means actuated by the conveyor for propelling an article from the conveyor into the test bore, looped means interposed between the terminal end of the test bore and the conveyor for guiding acceptable articles passed by the test bore to a position above the conveyor, means for advancing the acceptable articles through the test bore and the looped means, and means for dropping said acceptable article from said position onto the conveyor.

5. In a device for gaging the diameter of a cylindrical article advanced by a pallet, a first gage block having a first tapered recess formed therein, means actuated by the pallet for stopping the pallet in alignment with the first gage block, a second gage block aligned with and extending under the first gage block, said second gage block having a second tapered recess formed therein opposite to said first tapered recess, means for moving the second gage block into and out of engagement with the first gage block to form with the recesses a tapered gage bore between the engaged blocks, an air jet device mounted opposite to the gage bore for blowing the article from the pallet along the second gage block into the gage bore whereupon the article becomes lodged in the gage bore, and means for operating the moving means to move the second gage block out of engagement with the first gage block to release the lodged article.

6. In a device for sorting articles having acceptable and defective dimensions, a fixed test device, a movable test fixture, said device and fixture each having a recess formed therein, means for moving the fixture into engagement with the fixed device so that the recesses form a test bore, said test bore being effective to pass an acceptable article and to lodge a defective article therein, means for propelling said articles between the engaged fixture and fixed device to lodge a defective article in the test bore, and means rendered effective after a time delay sufficient for an acceptable article to pass through the test bore for separating the fixture and the device to release the lodged article.

7. In a device for sorting articles having a defective dimension from articles having an acceptable dimension, a fixture comprising separable means provided with opposed recesses for testing said articles, means for moving the separable means together to form a test bore with the recesses, said test bore being effective to lodge a defective article therein and to pass an acceptable article therethrough, means for propelling an acceptable article into the test bore for passage therethrough during a predetermined interval, said propelling means being effective to advance a defective article into the test bore to lodge said defective article in said test bore, and means actuated after said predetermined interval for actuating the moving means to advance said separable means apart and release the lodged article.

References Cited in the file of this patent

UNITED STATES PATENTS

| | | |
|---|---|---|
| 2,689,128 | Dowd | Sept. 14, 1954 |
| 2,771,191 | Kath | Nov. 20, 1956 |
| 2,791,329 | Schwartz | May 7, 1957 |

FOREIGN PATENTS

| | | |
|---|---|---|
| 311,805 | Germany | Apr. 11, 1919 |